(12) United States Patent
Rothoff

(10) Patent No.: US 9,090,286 B2
(45) Date of Patent: Jul. 28, 2015

(54) METHOD AND SYSTEM FOR ASSISTING A USER TO DISPLACE A VEHICLE TO A TARGET POSITION

(71) Applicant: VOLVO CAR CORPORATION, Goeteborg (SE)

(72) Inventor: Marcus Rothoff, Goeteborg (SE)

(73) Assignee: VOLVO CAR CORPORATION, Goeteborg (SE)

( * ) Notice: Subject to any disclaimer, the term of this patent is extended or adjusted under 35 U.S.C. 154(b) by 54 days.

(21) Appl. No.: 13/782,000

(22) Filed: Mar. 1, 2013

(65) Prior Publication Data

US 2013/0231821 A1 Sep. 5, 2013

(30) Foreign Application Priority Data

Mar. 5, 2012 (EP) .................................. 12158045

(51) Int. Cl.
*B62D 15/02* (2006.01)
*B62D 1/00* (2006.01)
*B62D 1/02* (2006.01)

(52) U.S. Cl.
CPC ............... *B62D 15/027* (2013.01); *B62D 1/00* (2013.01); *B62D 1/02* (2013.01)

(58) Field of Classification Search
CPC ........... B62D 1/00; B62D 15/027; B62D 1/02
USPC ................................. 701/23, 99, 70
See application file for complete search history.

(56) References Cited

U.S. PATENT DOCUMENTS 6,564,123 B2 * 5/2003 Hahn et al. ..................... 701/1
6,695,085 B2 2/2004 Mackle et al.
2008/0238072 A1 10/2008 Kofoed et al.

FOREIGN PATENT DOCUMENTS

| DE | 202008018157 | 1/2012 | |
| EP | 1249380 | 10/2002 | |
| EP | 2316709 | 5/2011 | |
| WO | 2005068276 | 7/2005 | |
| WO | WO2005068276 | * 7/2005 | .............. B60B 19/00 |

OTHER PUBLICATIONS

European Search Report for Application No. 12158045.0 dated Sep. 21, 2012.

* cited by examiner

*Primary Examiner* — Mary Cheung
*Assistant Examiner* — Brian P Sweeney
(74) *Attorney, Agent, or Firm* — Brooks Kushman P.C.

(57) ABSTRACT

A method for assisting a user to displace a vehicle to a target position is disclosed. The method may include activating an assistance mode, detecting an external force applied to the vehicle by the user, determining a displacement torque based on the external force, and displacing the vehicle toward the target position by applying the displacement torque using a vehicle propulsion system. A system for assisting a user to displace a vehicle to a target position is also disclosed.

20 Claims, 4 Drawing Sheets

METHOD AND SYSTEM FOR ASSISTING A USER TO DISPLACE A VEHICLE TO A TARGET POSITION

CROSS-REFERENCE TO RELATED APPLICATIONS

This application claims foreign priority benefits under 35 U.S.C. §119(a)-(d) to European patent application number EP 12158045.0, filed Mar. 5, 2012, which is incorporated herein by reference in its entirety.

TECHNICAL FIELD

The present disclosure relates to a method and a system for assisting a user to displace a vehicle to a target position. The present disclosure further relates to a system for assisting a user to displace a vehicle to a target position and a vehicle comprising such a system.

BACKGROUND

When parking a vehicle into a narrow space, it is sometimes difficult to exit the vehicle after parking, since the doors of the vehicle cannot be open properly. There may for example be other vehicles standing very close to the vehicle, or the vehicle may stand close to a building, a sign post, a tree or another object. Any potential passenger/s may exit the vehicle before parking it, but the driver has to exit the vehicle after parking it, which sometimes may require some gymnastic skill.

As an alternative, the driver and the passenger may exit the vehicle, when there still is space around it. Thereafter the vehicle may be pushed into the desired position. However, it is quite difficult to push a vehicle, especially for a single person, due to the weight of the vehicle and its rolling resistance. It will be even more difficult to push the vehicle, if the ground is sloped.

Document U.S. Pat. No. 6,564,123 B2 discloses a process for displacing a motor vehicle into a target position comprising the steps of:
- placing the motor vehicle in a starting position near the target position;
- following a first driver-side activation, scanning the environment of the motor vehicle continuously at least for detection of the target position, and determining continuously the current motor vehicle position;
- determining control data for displacing the motor vehicle into the target position with the aid of the determined environment and position information, and
- after a second driver-side activation, delivering control data-dependent control commands to at least one of a drive train, a brake system and a steering system of the motor vehicle, thus driving the motor vehicle driver-independently into the target position. The driver and any potential passengers may exit the vehicle before the parking process is performed.

According to U.S. Pat. No. 6,564,123 B2 the motor vehicle moves driver-independently into the target position. There is thus a potential risk that the user of the motor vehicle loses control of what is happening with the vehicle, especially if the vehicle moves to a position, wherein it is hidden behind another object, for example a van standing in the adjacent parking space. Even if the above-mentioned at least one of a drive train, a brake system and a steering system of the motor vehicle may continue to move the vehicle in such a situation, the user will feel that he/she has lost control, since he/she cannot see exactly what is happening. The user will not have control of the total amount of torque used for moving the vehicle driver-independently.

Moreover, if the vehicle runs into an obstacle, such as a child or a bag, and the vehicle is moving driver-independently, the obstacle may be difficult to see for the driver and in worst case the vehicle is stopped too late and runs over the obstacle.

According to Art.13§1 of the Vienna Convention on Road Traffic "Every driver of a vehicle shall in all circumstances have his vehicle under control so as to be able to exercise due and proper care and to be at all times in a position to perform all maneuvers required of him."

It is desirable that a method and a system for assisting displacing a vehicle into a target position fulfil the above convention. In addition the method and system desirably are intuitive to understand.

SUMMARY

The object of the present disclosure is to overcome or ameliorate at least one of the disadvantages of the prior art, or to provide a useful alternative.

It is desirable to provide a method for assisting a user to displace a vehicle to a target position, wherein the user is in control of the vehicle.

It is further desirable that the method and system fulfil the above-mentioned Art.13§1 of the Vienna Convention on Road Traffic.

It is also desirably that the method and system are intuitive to understand.

The object above may be achieved by the subject-matter of claim 1.

Thus, in a first aspect of the present disclosure, there is provided a method for assisting a user to displace a vehicle to a target position, the vehicle comprising a propulsion system for displacing the vehicle, the method comprising the steps of:
- a) positioning the vehicle in a first position in the proximity of the target position,
- b) activating an assistance mode,
- c) detecting an external force applied to the vehicle by the user,
- d) determining a displacement torque based on the external force,
- e) displacing the vehicle to or towards the target position by applying the displacement torque to the vehicle by means of the propulsion system.

The propulsion system may be the normal propulsion system of the vehicle. Alternatively a separate propulsion system may be used.

The vehicle may be driven in a normal way by the driver to the first position being in the proximity of the target position. The driver and any potential passengers may exit the vehicle after step a) or b).

The assistance mode may be activated by means of pressing a button in the vehicle, or using a key fob, a smart phone or a voice command.

After the user has exited the vehicle, he/she may place himself/herself in a position, wherein he/she may apply an external force to the vehicle, e.g. by pushing or pulling the vehicle using e.g. the hands, the feet or any other body part of the user. The external force may be applied shortly to start the displacement of the vehicle, or the external force may be applied intermittently or continuously during the displacement of the vehicle. Of course another person than the driver may apply the external force instead, such as a passenger. The term "user" refers to the driver or any other person applying the external force.

In step c), the external force is detected. It may be characterized by parameters such as size and direction. The term "external" refers to a source of the force indicating that the force is not coming from the vehicle's own propulsion system or another internal system of the vehicle. Normally, the external force is applied to the outside of the vehicle. However, the external force may also be applied to the interior of the vehicle, e.g. if a person pushes the vehicle gripping the inside of an open door or an open trunk. The external force can be applied directly by a human being, as will be described below. The external force may also be applied via another object, such as another vehicle.

Further, the external force of step c) is intentionally applied. For example, its direction, seeing force as a vector, is substantially in the direction towards the target position. If somebody leans against the vehicle for example during exiting the vehicle, that person will apply an unintentional force, the direction of which is unrelated to the direction towards the target position. Such unintentional force normally has a lower magnitude than an intentional external force. The force mentioned in c) does not include such an unintentional force. A threshold value may be used to distinguish between an intentional force, being on or above the threshold, and an unintentional force, being below the threshold. As an alternative, or as a complement, a sensor used to detect the external force may be located at a position in the vehicle suitable for manually pushing the vehicle, e.g. at the rear or the front of the vehicle. Such a position is different from a position likely to be touched when e.g. exiting the vehicle, e.g. close to the door of the vehicle. The vehicle may be pushed using e.g. the hands, the feet or any other body part of the user; the external force thus being a pushing force. Alternatively, the external force may be a pulling force. Optionally, the vehicle is displaced towards the target position independently of where the external force is applied.

It would in principle be possible to displace the vehicle with only manual force. In that case, a displacement torque directly resulting from the applied external force only would be used. However, in many situations it would be too heavy to displace the vehicle by manual force only. Therefore, the suggested disclosure discloses using the propulsion system mentioned above when displacing the vehicle, such that the vehicle is not entirely displaced by manual force only. Instead the vehicle is displaced by the propulsion system only, or a combination of the propulsion system and the applied external force.

The displacement torque is preferably applied continuously or intermittently during the displacing of the vehicle in step e) until the target position is reached. Intermittently may be performed in a number of steps. As an option, the size of the displacement torque may be adapted to account for a varying slope of the ground during performing the displacing of step e).

For example, the applied external force may initiate the displacement, especially if applied shortly to start the displacement, but the displacement may be performed at a preselected speed, no matter the size of the applied external force. As an alternative, the size of the applied external force may be reflected in the speed used during the displacement of the vehicle, such that a higher force results in a higher speed and thus corresponding higher torque, possibly by using a scaling-up factor as described below. However, according to the disclosure, the displacement of the vehicle is derived from the applied external force, such that the person applying the external force is in control of the vehicle.

The method according to the disclosure makes it possible to park vehicles closer to each other or to other objects. This is useful in narrow spaces, e.g. a private garage which is also being used as a storage space, such that there is a minimal space for the car. It is further possible to fill a certain space with more vehicles, since the vehicles may be parked closer to each other. This may be useful in a car park, a parking house or during transport of vehicles in a train or on a ferry.

The method of the disclosure further makes it easier to unload the vehicle, since this may be done in the first position with plenty of space around the vehicle. Space may for example be used to remove a child from the car, with or without the child seat.

If the vehicle runs into an obstacle, such as a child or a bag, and the vehicle is displaced as disclosed in step e), the vehicle will stop in front of most obstacles, since the applied torque, be it by the propulsion system only or a combination of the propulsion system and the applied external force, would not be large enough to force the vehicle over the obstacle. The method is therefore advantageous in a situation with narrow space and/or a high probability of an obstacle, especially an obstacle which is not easily spotted.

The target position or the first position may be a parking space, and the method may in that case be a method for assisting a user to park the vehicle in the parking space or to unpark the vehicle from the parking space.

The method may further comprise the additional step of:

f) retaining the vehicle in the first position, step f) being performed before step c).

It is easy and convenient to exit the vehicle, when it is retained in the first position. By performing step f), it is secured that the vehicle is stationary, when the driver and any potential passenger exit the vehicle. If the ground is horizontal, the retaining torque may be zero and step f) needs not to be performed. However, if the ground is sloped, a certain torque needs to be applied to the vehicle to keep it stationary in the first position. Step f) may comprise using a brake of the vehicle, e.g. a parking brake.

One way of performing step f) is to proceed according to f1) determining a retaining torque, the size of which is determined as the torque needed to be applied to the vehicle to retain the vehicle stationary in the first position, f2) applying the retaining torque to the vehicle.

After having determined the retaining torque, it is applied to the vehicle. The retaining torque is suitably applied to the driving wheels of the vehicle. This may be done using the ordinary propulsion system of the vehicle. Alternatively, a separate propulsion system may be used, which may be the same as the one used for the displacing in step e).

Step f) may be performed a number of times. Purely as an example, the weight of the vehicle is changed when the driver exits the vehicle. In order to compensate for this, a new retaining torque is determined, which keeps the vehicle stationary without a driver inside.

If the driver applied a brake such as a parking brake, before leaving the vehicle, e.g. since the vehicle was in a slope, the brake is preferably gradually released during gradual application of the retaining torque.

The method may further comprise the additional step of g) identifying the target position, step g) being performed before step e), for example after step a) or b).

The target position may be identified by the user, e.g. the driver and communicated to the vehicle. Alternatively, the vehicle itself may comprise means for autonomously identifying the target position.

If identified by the user, step g) may comprise marking a desired target position on a presentation means provided in the vehicle, such as a touchscreen display.

Step g) may comprise monitoring an environment around the vehicle with a monitoring means, such as a camera, an IR sensor, a radar, a laser sensor and/or an ultrasonic sensor. The information from the monitoring may be then used by a system for autonomously identifying the target position by image processing, e.g. a computer. Alternatively the information from the monitoring may be used as an input to the user for selection of the target position. The step of monitoring may for example be used to identify a free parking space in a car park.

Step e) may comprise autonomously steering the vehicle to or towards the target position during the displacing in step e). A steering system is used to steer the vehicle, while the displacement is performed as mentioned above, i.e. completely or partly by the propulsion system.

The method may further comprise a step h) automatically deactivating the assistance mode when the target position is reached, wherein step h) is performed after step e). For example the vehicle can be automatically stopped when it is completely within the parking space or before it hits a wall in a garage.

Step e) may further comprise controlling the speed of the vehicle such that a selectable speed limit is not exceeded during the displacing in step e). The torque of the propulsion system may be reduced or a brake may be applied in order to not exceed the speed limit.

Step e) further comprises applying a selectable rolling resistance during the displacing in step e), the selectable rolling resistance being k times the normal rolling resistance of the vehicle, with 0<k<1, more preferably 0<k≤0.4, most preferably 0<k≤0.2. The normal rolling resistance is defined as the rolling resistance of the vehicle if it was to be pushed entirely manually. A low value for the rolling resistance corresponds to an applied external force being scaled up many times, e.g. a rolling resistance of 0.1 would correspond to scaling up of the force by a factor 10. A rolling resistance of 1 would correspond to no scaling-up, i.e. pushing the vehicle entirely manually. A rolling resistance of 0 would correspond to a system without rolling resistance, i.e. the vehicle would continue moving as long as the ground is flat. The selectable rolling resistance k is thus in between these two extreme cases, such that the rolling resistance at least partly is overcome by the propulsion system. The displacement torque is resulting from a combination of the torque determined from the applied external force and the scaling-up calculation. In this way, the person applying the external force may be able to displace the vehicle by applying only a relatively small force. The rolling resistance may be selectable, such that it can be individually selected according to the desires of the person applying the external force. A weak person may choose a small rolling resistance while a strong person may use a rolling resistance close to 1. However, no matter what rolling resistance is selected, all displacement of the vehicle is derived from the applied external force, such that the person applying the force is in control of the vehicle.

In a second aspect of the present disclosure there is provided a system for assisting a user to displace a vehicle to a target position, the system comprising:
  an actuator for activating an assistance mode,
  means for detecting an external force applied to the vehicle by the user,
  means for determining a displacement torque based on the external force,
  a propulsion system for displacing the vehicle to or towards the target position by applying the displacement torque to the vehicle.

The propulsion system may be the normal propulsion system of the vehicle. Alternatively a separate propulsion system may be used.

The actuator may be a button in the vehicle, a key fob, a smart phone or an infotainment system of the vehicle. The actuator may also be used for deactivating the assistance mode.

The means for detecting the applied external force may be a force meter or a pressure meter. Alternatively, the means for detecting the applied external force may be an accelerometer, since force may be calculated as mass times acceleration.

The means for determining the displacement torque based on the external force may be a calculation means, e.g. an ECU, a processing unit or a computer. As described above, a rolling resistance may be used in the calculations.

The system may further comprise
  means for determining a retaining torque, the size of which is determined as the torque needed to be applied to the vehicle to retain the vehicle stationary in the first position, which means may comprise, e.g. an ECU, a processing unit or a computer,
  means for applying the retaining torque to the vehicle.

The means for applying the retaining torque to the vehicle is preferably the same as the propulsion system.

As an alternative, or a complement, the means for retaining the vehicle stationary may comprise means for determining the angle of the vehicle in relation to a vertical line (this angle representing the slope of the ground), means for determining the weight of the vehicle, and means to calculate a torque from the angle and the weight, such means which may comprise, e.g. an ECU, a processing unit or a computer, as well as means for applying the retaining torque to the vehicle.

The system may further comprise
  f) a steering assistance system adapted to autonomously steer the vehicle to or towards the target position during the displacement, e.g. towards a free parking space.

The system may further comprise
  g) a presentation means for presenting a representation of a region in the proximity of the vehicle,
  h) input means for selection of the desired target position.

The presentation means and input means may be a touchscreen display. The touchscreen display presents a view of the area ahead of the vehicle, e.g. a parking place. The desired target position may be selected by touching the touchscreen at the desired position. Alternatively a normal screen may be used, and the selection of the target position may be made by the help of movable cursor, e.g. operated by a mouse, touchpad or buttons. Such presentation means are known to the skilled person and will not be explained in any detail herein.

In a third aspect of the present disclosure there is provided a vehicle comprising a system as described above.

BRIEF DESCRIPTION OF THE DRAWINGS

The present disclosure will hereinafter be further explained by means of non-limiting examples with reference to the appended drawings wherein.

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. However, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
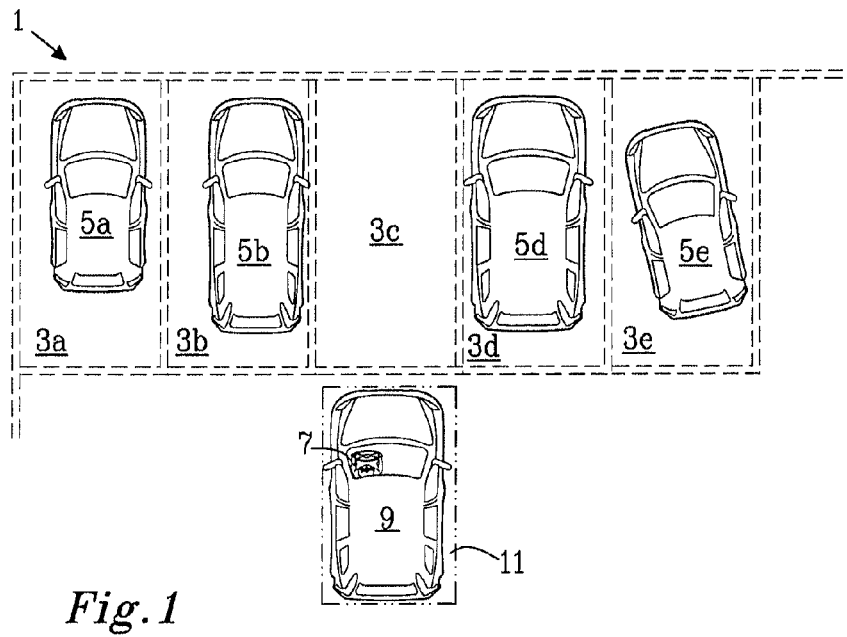
FIG. 1 is a schematic view of a car park, further illustrating a vehicle comprising a system according to the present disclosure.

FIG. 1 schematically illustrates a car park 1 comprising a number of parking spaces 3a, 3b, 3c, 3d, 3e . . . 3n. A number of vehicles 5a, 5b, 5d, 5e . . . 5n are parked each in a parking space 3a, 3b, 3d, 3e . . . 3n. A user 7, i.e. a driver of a vehicle 9, has temporarily positioned the vehicle 9 in a first position 11 in front of the desired target position 3c. The vehicle 9 comprises a system for assisting a user 7 to displace the vehicle 9 to the target position 3c. The system is described below in conjunction with FIG. 3. The only free parking space 3c, which is the target position in this example, is rather narrow, since the vehicles 5b, 5d in the adjacent parking spaces 3b, 3d are parked close to the lines of the parking space and the vehicles 5b, 5d are relatively large. Therefore, if the user 7 drives the vehicle 9 into the free parking space 3c, it will be difficult for the user 7 to exit the vehicle 9, once it is parked, as the doors of the vehicle cannot be opened to the extent needed.

Figure 2:
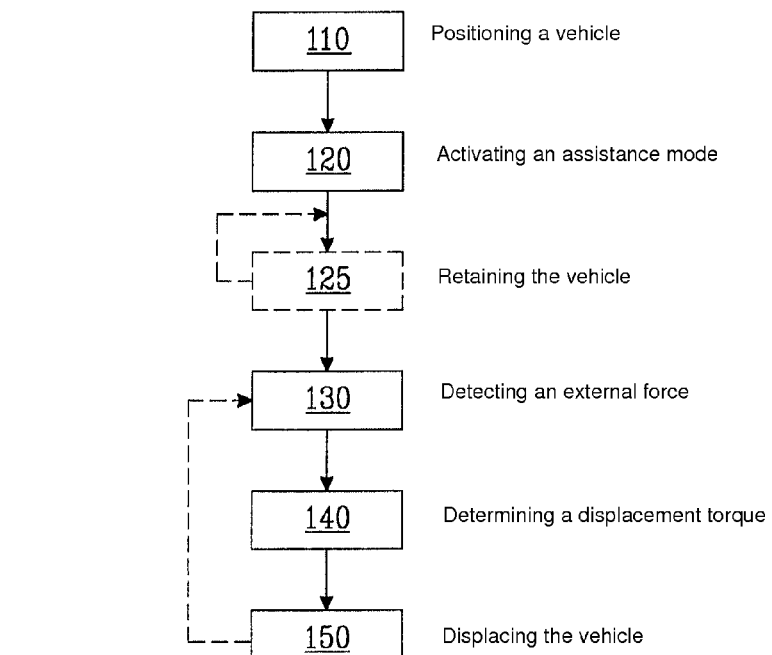
FIG. 2 is a flow-chart of a method according to the present disclosure.

However, since the vehicle 9 comprises the system for assisting a user to displace a vehicle to a target position according to the disclosure, the user 7 can choose to exit the vehicle 7, when it is in the first position 11 in the proximity of the target position 3c and proceed according to a method described in conjunction with FIG. 2.

FIG. 2 shows the steps of a method according to the disclosure:

110: Positioning the vehicle in the first position in the proximity of the target position.

120: Activating an assistance mode.

130: Detecting an external force applied to the vehicle from the outside of the vehicle by the user.

140: Determining a displacement torque based on the external force.

150: Displacing the vehicle to or towards the target position by applying the displacement torque to the vehicle by means of a propulsion system.

Step 110 is illustrated in FIG. 1. The vehicle 9 has been driven in a normal way by the user 7 to a first position 11 being in the proximity of the target position 3c.

The user 7 and any potential passengers can exit the vehicle 9 after step 110 or 120.

Step 120 is in this example performed by pressing a button in the vehicle, or using key with a transmitter, a smart phone or a voice command or the like. Step 120 may alternatively be performed before step 110.

The propulsion system used in step 150 may be the normal propulsion system of the vehicle. Alternatively a separate propulsion system may be used.

Figure 4:
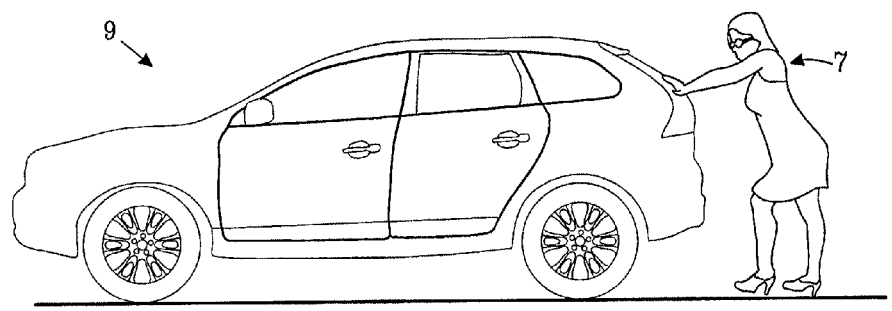
FIG. 4 illustrates the vehicle of FIG. 1 being pushed.

After the user 7 has exited the vehicle 9, he/she may place himself/herself in a position, wherein he/she may apply an external force to the vehicle, e.g. by pushing the vehicle with his/her hands, as shown in FIG. 4, or by using his/her feet or another body part. The external force may be applied shortly to start the displacement of the vehicle 9, or the external force may be applied intermittently or continuously during the displacement of the vehicle 9. Of course, another person, such as a passenger, may apply the external force instead of or together with the driver of the vehicle 9. The term "user" 7 refers to the driver or any other person applying the external force. In step 130, the external force is detected. It may be characterized by parameters such as size and direction.

It would in principle be possible to displace the vehicle with only manual force in step 150. In that case, a displacement torque directly resulting from the applied external force would be applied in step 150. However, in many situations it would be quite heavy to displace the vehicle 9 by manual force only. Therefore, the suggested disclosure discloses using the propulsion system of the vehicle mentioned above, such that the vehicle is not entirely displaced by manual force only.

The displacement torque is preferably applied continuously or intermittently during the displacing of the vehicle 9 in step 150 until the target position 3c is reached. Intermittently may be performed in a number of steps. As an option, the size of the displacement torque may be adapted to account for a varying slope of the ground during performing the displacing of step 150.

In an embodiment, the displacement torque is calculated from the applied external force by using a scaling factor, such that the applied external force is scaled up. The scaling factor may be expressed as a rolling resistance being k times the normal rolling resistance of the vehicle, with $0<k<1$, more preferably $0<k\leq0.4$, most preferably $0<k\leq0.2$. The normal rolling resistance is defined as the rolling resistance of the vehicle if it was to be pushed entirely manually. A low value for the rolling resistance corresponds to an external force being scaled up many times, e.g. a rolling resistance of 0.1 would correspond to scaling up of the force by a factor 10. A rolling resistance of 1 would correspond to no scaling-up. A rolling resistance of 0 would correspond to a vehicle without rolling resistance, i.e. the vehicle would continue moving as long as the ground is flat. The selectable rolling resistance k is thus in between these two extreme cases, such that the rolling resistance at least partly is overcome by the propulsion system. The displacement torque is hence resulting from a combination of the torque determined from the applied external force and the scaling-up calculation. In this way, the person applying the external force is able to displace the vehicle by applying only a relatively small force. The rolling resistance may be selectable, such that it can be individually selected according to the desires of the person applying the external force. A weak person may choose a small rolling resistance, while a strong person may use a rolling resistance close to 1. However, no matter which rolling resistance is selected, all displacement of the vehicle is derived from the applied external force, such that the person applying the force is in control of the vehicle.

Figure 5:
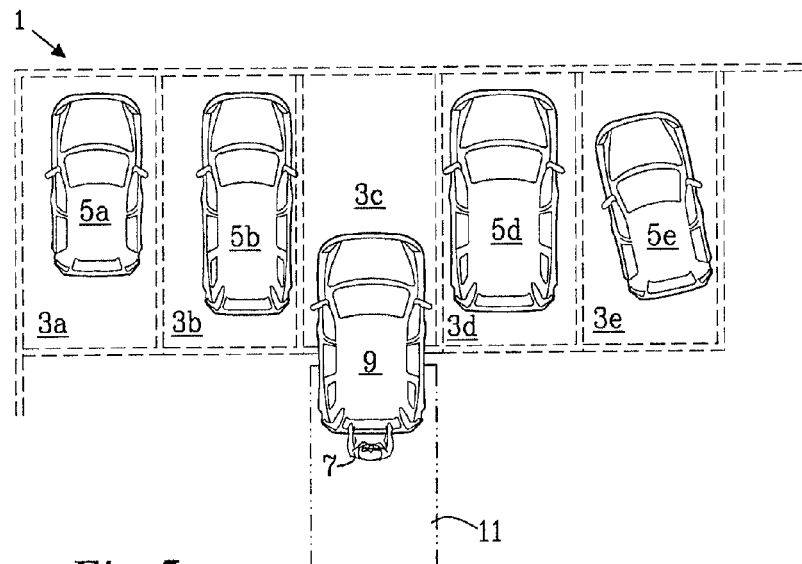
FIG. 5 illustrates the car park of FIG. 1 further illustrating the vehicle being displaced towards a target position.

In step 150 the displacement torque is applied to the vehicle. The vehicle 9 is then displaced towards the target position as illustrated in FIG. 5. The vehicle can move fully into the target position, or it can move step-wise. In the latter case, the method will repeat some of the steps. It may for example return to step 130. Steps 130, 140 and 150 are then repeated until the target position is reached.

There may be an optional step 125, in between steps 120 and 130, comprising retaining the vehicle in the first position.

One way of performing step 125 is to first determine a retaining torque. The retaining torque is the torque which is needed to be applied to the vehicle 9 in order to keep the vehicle stationary, when in the first position. If the ground is horizontal, the retaining torque may be zero and step 125 needs not to be performed. However, if the ground is sloped, a certain torque needs to be applied to the vehicle to keep it stationary in the first position.

After having determined the retaining torque, retaining torque is applied to the vehicle. The retaining torque is suitably applied to the driving wheels of the vehicle. This may be done using the ordinary propulsion system of the vehicle 9. Alternatively, a separate propulsion system may be used, which may be the same as in step 150. By performing step 125, it is secured that the vehicle is stationary, i.e. retained in the first position 11, when the user 7 and any passenger exit the vehicle 9.

Step 125 may be performed a number of times. Purely as a non-limiting example, the weight of the vehicle 9 is changed when the user 7 exits the vehicle. In order to compensate for this, a new retaining torque is determined, which keeps the vehicle stationary in the new state without the user inside.

If the user applied a brake, such as a parking brake, before leaving the vehicle, e.g. since the vehicle was in a slope, the brake is preferably gradually released during gradual application of the retaining torque.

Figure 3:
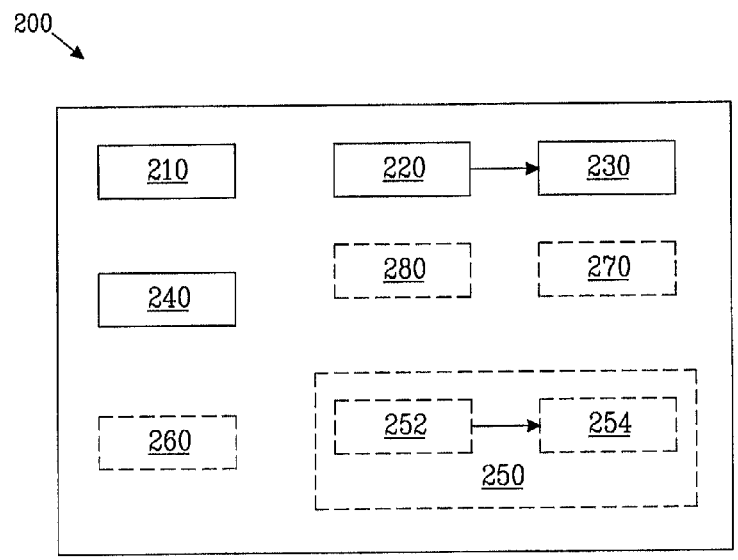
FIG. 3 illustrates a system according to the present disclosure.

FIG. 3 illustrates a system 200 according to an embodiment of the disclosure. The system 200 comprises:
- an actuator 210 for activating an assistance mode,
- means 220 for detecting an external force, applied to the vehicle 9 by the user 7,
- means 230 for determining a displacement torque based on the external force,
- a propulsion system 240 for displacing the vehicle 9 to or towards the target position 3c by applying the displacement torque to the vehicle 9.

The actuator 210 may be a button in the vehicle or a on a key, a smart phone or an infotainment system of the vehicle 9. The actuator 210 may also be used for deactivating the assistance mode.

The means 220 for detecting the applied external force may be a force meter or a pressure meter. Alternatively, the means 220 for detecting the applied external force may be an accelerometer, since force may be calculated as mass times acceleration.

The means 230 for determining the displacement torque based on the external force may be a calculation means, e.g. an ECU, a processing unit or a computer. As described above, a rolling resistance may be used in the calculations.

The propulsion system 240 for displacing the vehicle 9 to, or towards, the target position 3c by applying the displacement torque to the vehicle 9 may be the ordinary propulsion system of the vehicle 9. Alternatively a separate propulsion system may be used.

In addition, the system 200 may comprise means 250 for retaining the vehicle stationary in the first position in the proximity of the target position.

The means 250 for retaining the vehicle 9 stationary in the first position in the proximity of the target position may comprise
- means 252 for determining the retaining torque and
- means 254 for applying the retaining torque to the vehicle 9.

The means 250 for retaining the vehicle stationary may operate by gradually releasing a brake, while gradually applying more torque to the vehicle in order to keep the vehicle stationary, and may comprise, e.g. an ECU, a processing unit or a computer. The retaining torque is thereby indirectly determined.

The means 254 for applying the retaining torque to the vehicle 9 is preferably the same as the propulsion system 240.

As an alternative, or a complement, the means 250 for retaining the vehicle stationary may comprise means for determining the angle of the vehicle in relation to a vertical line (this angle representing the slope of the ground), means for determining the weight of the vehicle 9, means to calculate a torque from the angle and the weight, such means which may comprise, e.g. an ECU, a processing unit or a computer, as well as means 254 for applying the retaining torque to the vehicle.

The system may further comprise monitoring means 260 for monitoring the environment around the vehicle, such as a camera, an IR sensor, a radar, a laser sensor and/or an ultrasonic sensor. The monitoring means 260 may be used to identify a target position, such as a free parking space 3c, and optionally the area and or shape of the target position. The monitoring means 260 may further be used to detect an object risking to be run over during the displacing the vehicle towards the target position. If such an object is detected, the displacement torque applied by the propulsion system 240 may be reduced or removed. In that case, the object would only be hit by the vehicle being propelled by external force applied by the user, which in most cases would be much too low to run over the object. As an alternative, the displacement operation as described by the method in step 150 may be aborted.

FIG. 4 illustrates a vehicle 9 and a person 7 applying an external force. The external force is applied from the outside of the vehicle 9 and is not a part of the propulsion system of the vehicle. When the vehicle 9 is to be parked with front first it is suitable to push on the rear end of the vehicle 9 as illustrated in FIG. 4. As an alternative, the vehicle may be parked with rear end first. It is then suitable to push at the front end of the vehicle.

FIG. 5 illustrates a situation when the vehicle has been displaced halfway between the first position 11 and the target position 3c.

Figure 6:
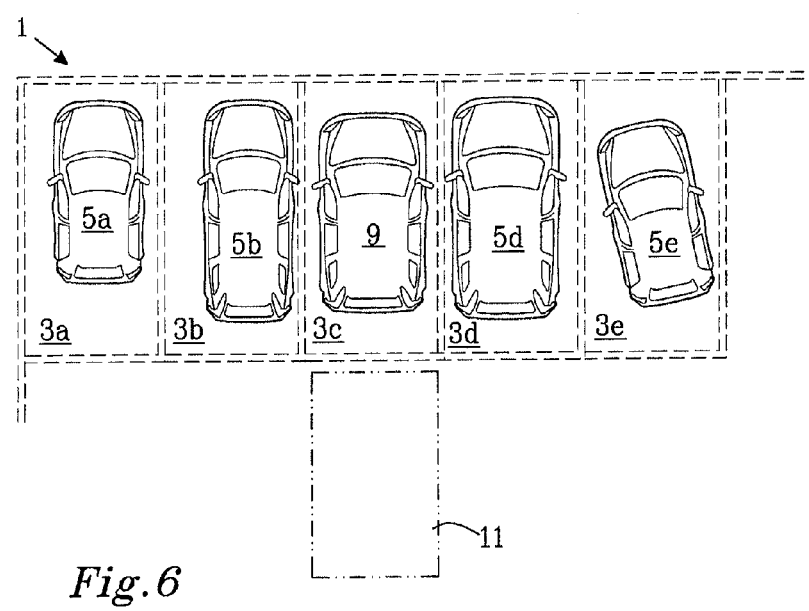
FIG. 6 illustrates the car park of FIG. 1 further illustrating the vehicle having reached the target position.

In FIG. 6 the vehicle 9 has been displaced into the target position 3c and the vehicle 9 has stopped. The method described above may comprise further steps of the vehicle 9 autonomously reducing the displacement torque and/or applying a brake when the target position is reached. In order to park the vehicle correctly, steering may be applied autonomously to obtain a desired target position space 3c or other defined area. This may be performed with a steering assistance system 270, see the system 200 of FIG. 3.

Figure 7:
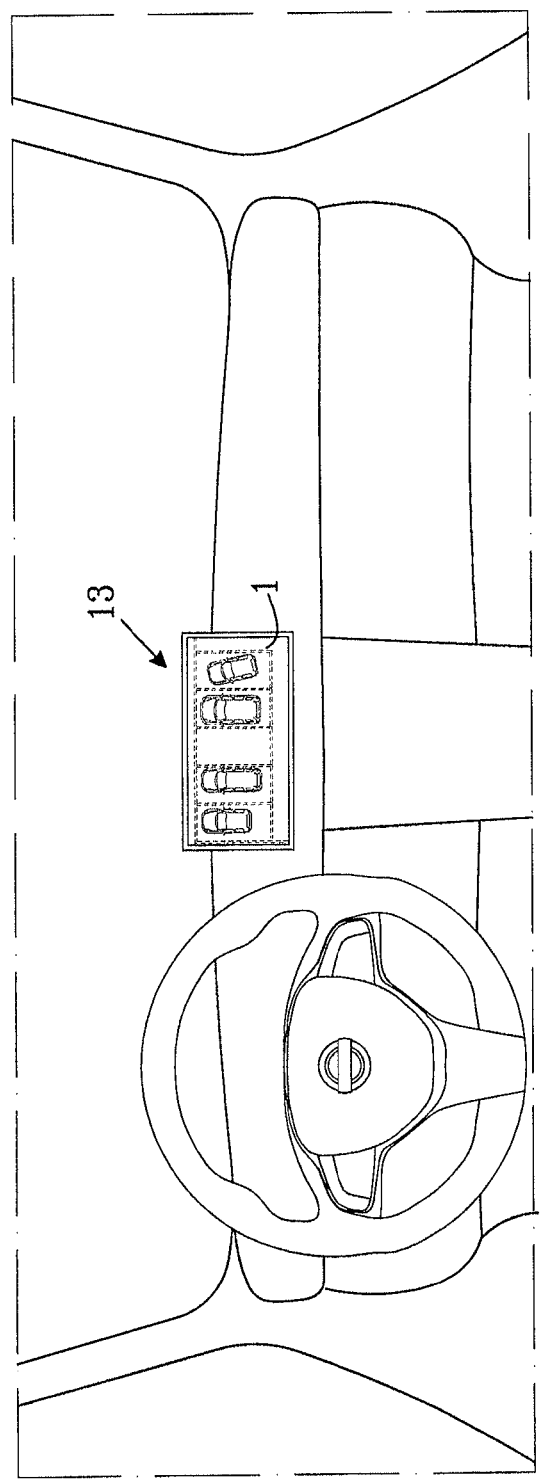
FIG. 7 is a schematic view of a presentation means used in a system according to the present disclosure.

The system 200 may further comprise a presentation means 280. The presentation means 280 may be a touchscreen display 13 as illustrated in FIG. 7. The touchscreen display 13 presents a view of the area ahead of the vehicle, e.g. a parking place 1. The desired target position may be selected by touching the touchscreen 13 at the desired position. Alternatively a normal screen may be used, and the selection of the target position may be made by the help of movable cursor, e.g. operated by a mouse, touchpad or buttons. Such presentation means are known to the skilled person and will not be explained in any detail herein.

Further modifications of the disclosure within the scope of the appended claims are feasible. As such, the present disclosure should not be considered as limited by the embodiments and figures described herein. Rather, the full scope thereof should be determined by the appended claims, with reference to the description and drawings.

The vehicle is suitably a motor vehicle, such as a car. The propulsion system may comprise an internal combustion engine, running on a liquid or gaseous fuel, such as petrol, diesel, gas, ethanol or methanol, or an electric engine or a hybrid engine.

What is claimed is:

1. A method for assisting a user to displace a vehicle to a target position, said vehicle comprising a propulsion system for displacing said vehicle, means for detecting an external force applied to said vehicle, and means for determining a displacement torque, said method comprising:
    positioning said vehicle in a first position in the proximity of said target position;
    detecting, using the detection means, an external force applied by said user to a body part of the vehicle other than a steering component of said vehicle;
    determining, using the determining means, a displacement torque based on said external force; and
    displacing said vehicle to or towards said target position by applying said displacement torque to said vehicle by means of said propulsion system.

2. The method according to claim 1, wherein said target position or said first position is a parking space.

3. The method according to claim 1, wherein the method further comprises:
    retaining said vehicle in said first position before detecting an external force.

4. The method according to claim 3, wherein retaining said vehicle comprises:
    determining a retaining torque needed to be applied to said vehicle to retain said vehicle stationary in said first position; and
    applying said retaining torque to said vehicle.

5. The method according to claim 1, wherein the method further comprises:
    identifying said target position.

6. The method according to claim 5, wherein identifying said target position comprises marking a desired target position on a presentation means provided in said vehicle.

7. The method according to claim 5, wherein identifying said target position comprises monitoring outside the vehicle with a monitoring means, such as a camera, an IR sensor, a radar, a laser sensor and/or an ultrasonic sensor.

8. The method according to claim 1, wherein displacing said vehicle comprises autonomously steering said vehicle using a vehicle steering system to or towards said target position.

9. The method according to claim 1, wherein said method further comprises:
    activating an assistance mode before detecting an external force; and
    automatically deactivating said assistance mode when said target position is reached.

10. The method according to claim 1, wherein displacing said vehicle comprises controlling a speed of said vehicle using said propulsion system such that a selectable speed limit is not exceeded.

11. The method according to claim 1, wherein displacing said vehicle further comprises applying a selectable rolling resistance using said propulsion system, said selectable rolling resistance being k times the normal rolling resistance of said vehicle, with $0<k<1$, more preferably $0<k\leq0.4$, most preferably $0<k\leq0.2$.

12. A system for assisting a user to displace a vehicle to a target position, said system comprising:
    means for detecting an external force applied to said vehicle by said user;
    means for determining a displacement torque based on said external force; and
    a propulsion system for displacing said vehicle to or towards said target position by applying said displacement torque to said vehicle;
    wherein the external force is applied to a body part of the vehicle other than a steering component of said vehicle.

13. The system according to claim 12, wherein said system further comprises:
    means for determining a retaining torque needed to be applied to said vehicle to retain said vehicle stationary in said first position; and
    means for applying said retaining torque to said vehicle.

14. The system according to claim 12 further comprising:
    presentation means for presenting a representation of a region in proximity of said vehicle; and
    input means for selection of said desired target position.

15. A method for assisting a user to displace a vehicle to a target position, said vehicle comprising a propulsion system, means for detecting an external force applied to the vehicle, and means for determining a displacement torque, said method comprising:
    detecting, using the detecting means, an external force applied by said user to a body part of the vehicle other than a steering component of said vehicle;
    determining, using the determining means, a displacement torque based on said external force; and
    displacing said vehicle toward said target position by applying said displacement torque to said vehicle using said propulsion system.

16. The method according to claim 15 further comprising identifying by a processor said target position based on user input.

17. The method according to claim 16 wherein identifying said target position comprises monitoring outside the vehicle using a monitoring system.

18. The method according to claim 15 wherein displacing said vehicle toward said target position comprises autonomously steering said vehicle using a vehicle steering system towards said target position.

19. The method according to claim 15 further comprising activating an assistance mode before detecting an external force and automatically deactivating said assistance mode when said target position is reached.

20. The method according to claim 15 wherein displacing said vehicle toward said target position comprises controlling a speed of said vehicle using said propulsion system such that a selectable speed limit is not exceeded.

* * * * *